(12) United States Patent
Kim et al.

(10) Patent No.: US 11,342,552 B2
(45) Date of Patent: May 24, 2022

(54) METHOD OF PREPARING CATHODE ACTIVE MATERIAL AND CATHODE ACTIVE MATERIAL

(71) Applicant: Korea University Research and Business Foundation, Seoul (KR)

(72) Inventors: Dong-Wan Kim, Seoul (KR); Seung-Deok Seo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 44 days.

(21) Appl. No.: 16/916,563

(22) Filed: Jun. 30, 2020

(65) Prior Publication Data

US 2021/0043923 A1    Feb. 11, 2021

(30) Foreign Application Priority Data

Aug. 6, 2019    (KR) .......................... 10-2019-0095253

(51) Int. Cl.

| | |
|---|---|
| *H01M 4/58* | (2010.01) |
| *H01M 4/36* | (2006.01) |
| *H01M 4/38* | (2006.01) |
| *H01M 10/052* | (2010.01) |
| *H01M 4/587* | (2010.01) |
| *H01M 4/02* | (2006.01) |

(52) U.S. Cl.
CPC .............. *H01M 4/364* (2013.01); *H01M 4/38* (2013.01); *H01M 4/587* (2013.01); *H01M 4/5815* (2013.01); *H01M 10/052* (2013.01); *H01M 2004/028* (2013.01)

(58) Field of Classification Search
CPC ............... H01M 10/052; H01M 4/366; H01M 2004/028
See application file for complete search history.

(56) References Cited

U.S. PATENT DOCUMENTS

2021/0050587 A1 *   2/2021   Lee .......................... B01J 21/18

FOREIGN PATENT DOCUMENTS

| CN | 105428618 A | 3/2016 | |
|---|---|---|---|
| CN | 107910198 A * | 4/2018 | ............. H01G 11/30 |
| CN | 108682816 A * | 10/2018 | .......... H01M 10/052 |

(Continued)

OTHER PUBLICATIONS

Zhou, Jie et al., "Synthesis of S/CoS2 nanoparticles-embedded N-doped Carbon Polyhedrons from Polyhedrons ZIF-67 and their Properties in Lithium-Sulfur Batteries", *Electrochimica Acta*, vol. 218, Nov. 10, 2016 (pp. 243-251).

(Continued)

*Primary Examiner* — Khanh T Nguyen
(74) *Attorney, Agent, or Firm* — NSIP Law

(57) ABSTRACT

Provide are a method of manufacturing a cathode material including (A) synthesizing a precursor including a metal compound and a carbon compound, (B) carbonizing the precursor in an inert atmosphere to produce a metal-carbon composite, (C) sulfurizing the metal-carbon composite in a sulfur atmosphere to produce a metal-metal sulfide-carbon composite, (D) removing metal particles from the metal-metal sulfide-carbon composite to produce a metal sulfide-carbon composite, and (E) synthesizing sulfur particles in the metal sulfide-carbon composite to produce a metal sulfide-sulfur-carbon composite, and a cathode active material.

8 Claims, 20 Drawing Sheets

(56) References Cited

FOREIGN PATENT DOCUMENTS

| | | |
|---|---|---|
| JP | 2005-22902 A | 1/2005 |
| JP | 2008-63219 A | 3/2008 |
| JP | 2017-188301 A | 10/2017 |
| JP | 2019-517729 A | 6/2019 |
| JP | 2020-119643 A | 8/2020 |
| KR | 10-1488244 B1 | 1/2015 |
| KR | 10-1820867 B1 | 3/2018 |
| KR | 10-2018-0061034 A | 6/2018 |
| KR | 10-2019-0036700 A | 4/2019 |
| KR | 10-2019-0060262 A | 6/2019 |
| KR | 10-2019-0068066 A | 6/2019 |

OTHER PUBLICATIONS

Deok Seo, Seung et al., ""Brain-Coral-Like" Mesoporous Hollow $CoS_2$@N-Doped Graphitic Carbon Nanoshells as Efficient Sulfur Reservoirs for Lithium-Sulfur Batteries", *Advanced Functional Materials*, vol. 29, Issue 38, Jul. 8, 2019 (pp. 1-11).

\* cited by examiner

EXAMPLE

COMPARATIVE EXAMPLE 1

COMPARATIVE EXAMPLE 2

METHOD OF PREPARING CATHODE ACTIVE MATERIAL AND CATHODE ACTIVE MATERIAL

CROSS-REFERENCE TO RELATED APPLICATIONS

A claim for priority under 35 U.S.C. § 119 is made to Korean Patent Application No. 10-2019-0095253 filed on Aug. 6, 2019, in the Korean Intellectual Property Office, the entire contents of which are hereby incorporated by reference.

BACKGROUND

Embodiments of the inventive concept described herein relate to a method of preparing cathode active material and cathode active material.

The present invention is the (Foundation) Future Materials Discovery Project of the Korea Research Foundation (Task No.: 2018058744, Research institute: Korea Research Foundation, Research Project Name: (3 details) Research on the application of solid electrolytes to superionic conductors, host organization: It was derived from research conducted as part of Korea University Industry-Academy Cooperation Group, Research Period: 2020.01.16~2021.01.15, Contribution Rate: 1/2).

In addition, the present invention is supported by the Korea Research Foundation (Scientific) Mid-sized Researcher Support-Mid-sized Research (Subsequent) (Task No.: 2019070203, Research Management Agency: Korea Research Foundation, Research Project Name: Hyper Ion/Charge Conductive Material Design and Innovation layer Nano-engineering, Host organization: Korea University Industry-University Cooperation Group, Research period: 2020,03,01~2021.02.28, Contribution rate: 1/2).

Sulfur, a cathode active material of a lithium-sulfur battery, which emerges as one of next generation secondary batteries, is required to improve conductivity due to low conductivity through formation of a composite with a high-conductivity matrix such as carbon.

Among composites, a composite with porous carbon has a high conductivity but has disadvantages that a method of forming a porous structure is complicated and sulfur loading amount is limited depending on a difference in pore shape and porosity.

In addition, shuttle phenomenon of lithium polysulfide generated by a reaction of lithium and sulfur occurs through only physical mixing, thereby deteriorating battery performance.

Studies have been conducted to form a carbon structure with internal pores as a way to load higher amounts of sulfur. Recently, studies of a compound of a metal chalcogenide compound and a carbon nanostructure have been conducted to prevent lithium polysulfide shuttle phenomenon. However, as described above, sulfur, which is the cathode material of the lithium-sulfur battery, is difficult to be used as the electrode active material by itself, due to its inherent low conductivity and lithium polysulfide elution.

SUMMARY

Embodiments of the inventive concept provide a method of manufacturing a cathode active material capable of preparing a porous carbon composite and increasing conductivity and sulfur content ratio when preparing a complex of the porous carbon composite and sulfur, compared to a mechanical mixture of a conventional sulfur electrode or carbon, an active material, a cathode for a lithium-sulfur battery, and a lithium-sulfur battery.

In addition, embodiments of the inventive concept provide to a method of manufacturing a cathode active material capable of effectively adsorbing lithium polysulfide to increase elution inhibition because cobalt sulfide nanoparticles are evenly dispersed inside a carbon composite, a cathode active material, a cathode for a lithium-sulfur battery, and a lithium-sulfur battery.

Meanwhile, the technical subjects of the inventive concept that may be obtained in the inventive concept are not limited to the foregoing technical subjects and any other technical subjects not mentioned herein may be easily understood by a person skilled in the art from the following disclosure.

According to an exemplary embodiment, a method of manufacturing a cathode material includes (A) synthesizing a precursor including a metal compound and a carbon compound, (B) carbonizing the precursor in an inert atmosphere to produce a metal-carbon composite, (C) sulfurizing the metal-carbon composite in a sulfur atmosphere to produce a metal-metal sulfide-carbon composite, (D) removing metal particles from the metal-metal sulfide-carbon composite to produce a metal sulfide-carbon composite, and (E) merging sulfur particles in the metal sulfide-carbon composite to produce a metal sulfide-sulfur-carbon composite.

In addition, in operation (A), a first solution in which the metal compound is dissolved and a second solution in which the carbon compound is dissolved may be mixed, washed and dried to synthesize the precursor.

In addition, in operation (B), a metal of the metal compound of the precursor may be crystallized into metal particles, and a carbon of the carbon compound of the precursor may be graphitized into a porous carbon material, to produce a porous metal-carbon composite including a plurality of metal particles.

In addition, in operation (B), a carbon of the carbon compound of the precursor may be graphitized by catalysis of the metal.

In addition, in operation (C), some metal particles of the plurality of metal particles may be synthesized into metal sulfides to produce a metal-metal sulfide-carbon composite including metal sulfide and a plurality of metal nanoparticles.

In addition, in operation (D), the plurality of metal nanoparticles may be removed by etching in an acidic solution.

In addition, in operation (E), a content of the sulfur particles may be 60% to 75% by weight based on a total weight of the metal sulfide-sulfur-carbon composite.

In addition, in operation (A), the precursor may have a hollow sphere including a plurality of internal pores.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
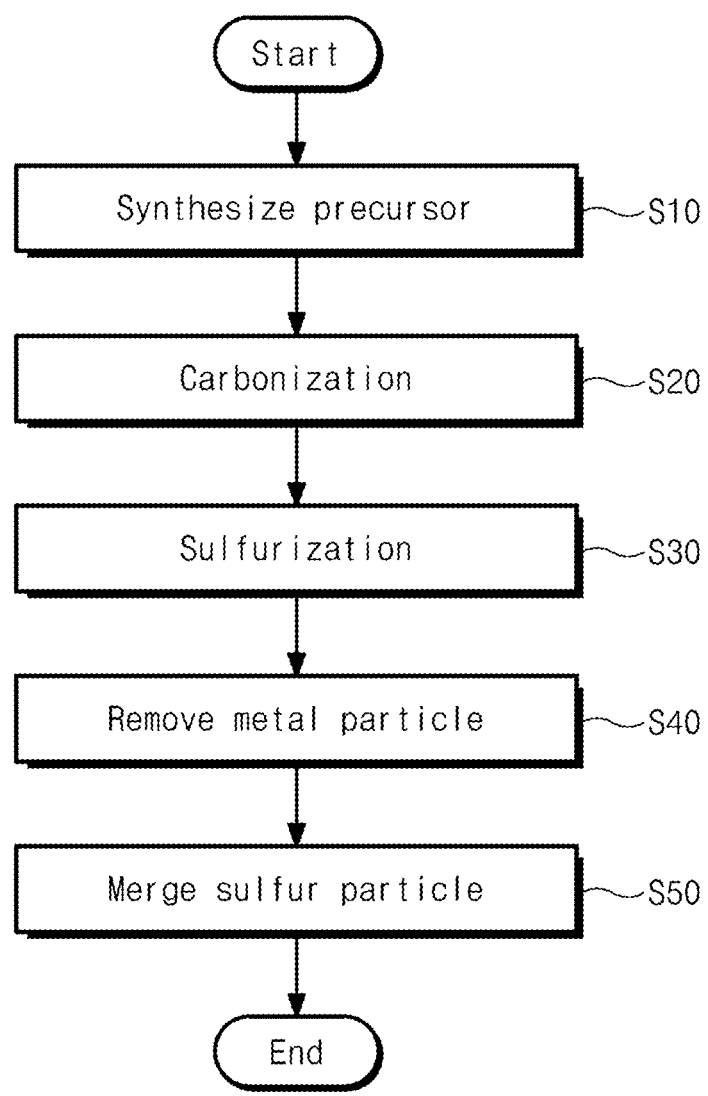
FIG. 1 is a flow chart illustrating a method of manufacturing a cathode active material according to an embodiment of the inventive concept.

Hereinafter, embodiments of the inventive concept will be described in more detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity.

In order to clarify the solution of the present disclosure to the problems, the configuration of the present disclosure is described in detail with reference to the accompanying drawings where the same component is endowed with the same reference symbol at different drawings. Moreover, when a drawing is explained, a component depicted in another drawing may be recited.

Meanwhile, hereinafter, '@' used in a composite expresses a meaning of "at". For example, in a case of "A@B", it is defined as meaning that "A" is located in "B" matrix. '/' expresses composite. For example "/S" may be defined that as a composite of "S".

In addition, 'NGCNs' described below may be defined as 'N-Doped Graphitic Carbon Nanoshell'.

Figure 2:
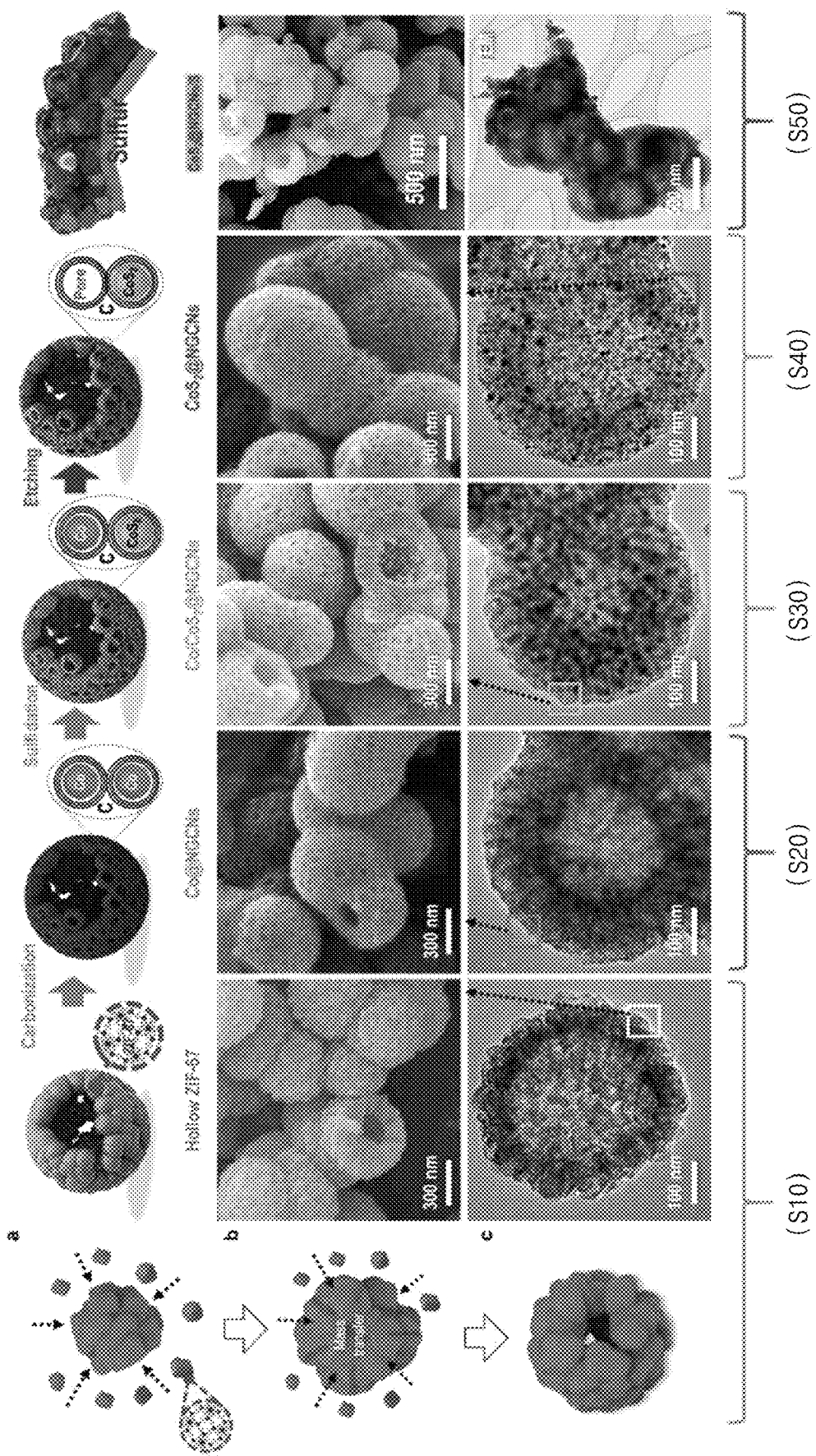
FIG. 2 is an image illustrating an active material structure at each operation of the method of manufacturing the cathode active material according to FIG. 1.

FIG. 1 is a flow chart illustrating a method of manufacturing a cathode active material according to an embodiment of the inventive concept and FIG. 2 is an image illustrating an active material structure at each operation of the method of manufacturing the cathode active material according to FIG. 1.

Referring to FIGS. 1 and 2, a method of manufacturing a cathode active material according to an embodiment of the inventive concept may include synthesizing a precursor in S10, carbonization in S20, sulfurization in S30, removing metal particles in S40, and merging sulfur particles in S50.

Meanwhile, in the method of manufacturing the cathode active material according to an embodiment of the inventive concept, the precursor of a hollow sphere may be synthesized in the synthesizing of the precursor in S10, and then carbonizing the precursor in S20, sulfurizing the precursor in S30, and removing the metal particles in S40 to increase size and proportion of mesopores in the structure. Therefore, sulfur, a reactive active material, may be efficiently dispersed into the mesopores.

In the synthesizing of the precursor in S10, the precursor including a metal compound and a carbon compound is synthesized.

Here, the metal compound may include metal particles and the carbon compound may include carbon particles.

Meanwhile, a first solution in which the metal compound is dissolved and a second solution in which the carbon compound is dissolved may be mixed, washed, and dried to synthesize the precursor.

For example, in the synthesizing of the precursor in S10 of an embodiment of the inventive concept, the precursor (Hollow ZIF-67) may be synthesized as follows.

The first solution (0.05M cobalt sulfate methanol solution) and the second solution (0.4M 2-methylimidazole methanol solution) are prepared, respectively.

The first solution and the second solution are quickly mixed and reacted with stirring for 2 hours.

After the reaction, the solution is precipitated, washed with ethanol and dried to synthesize the precursor.

Figure 3A:
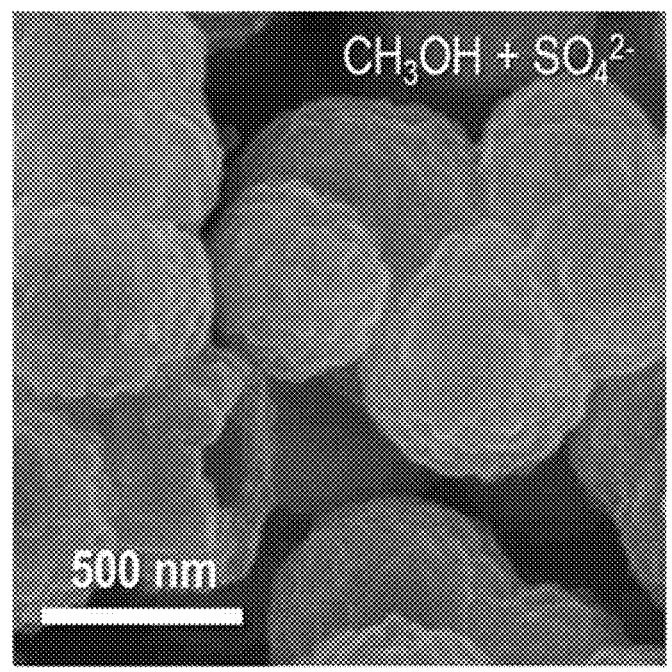
FIG. 3A-FIG. 3C are images comparing a precursor structure according to an embodiment of the inventive concept to precursor structures according to Comparative Example 1 and Comparative Example 2.
Figure 3B:
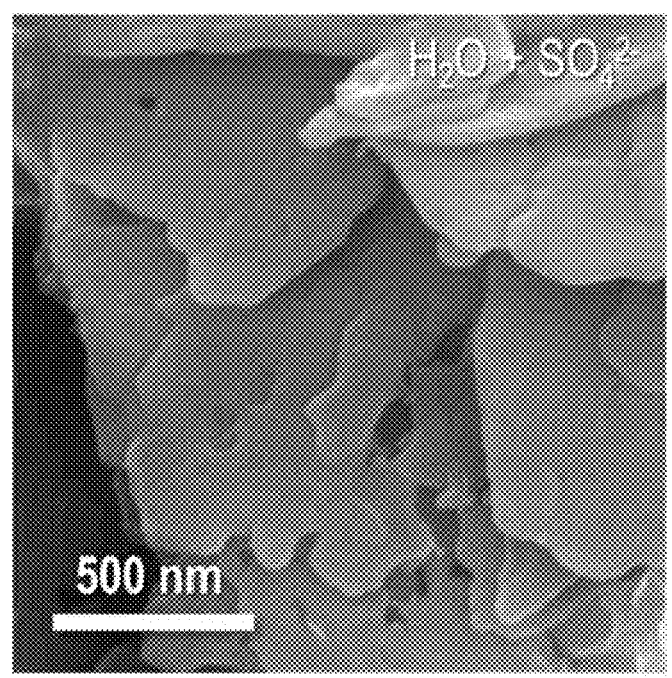
Figure 3C:
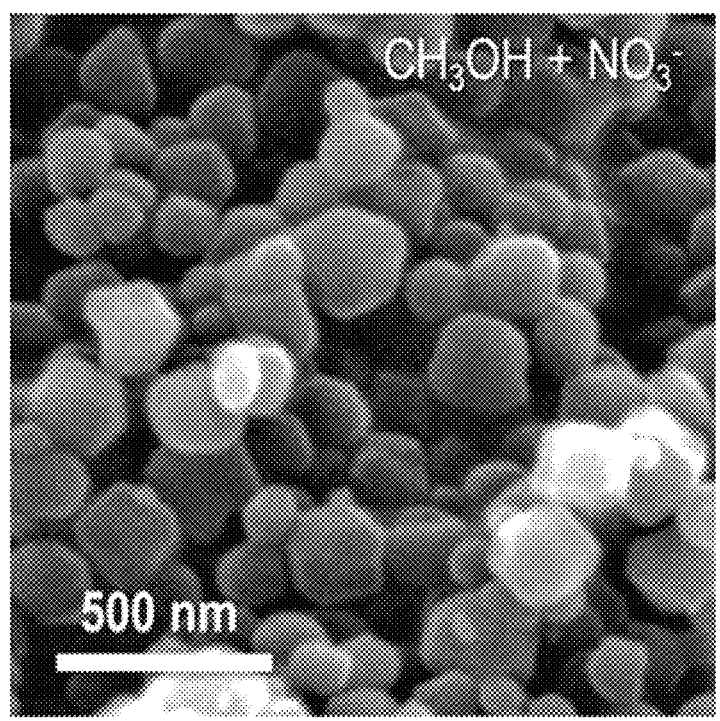

Here, FIG. 3A-FIG. 3C are images comparing a precursor structure according to an embodiment of the inventive concept to precursor structures according to Comparative Example 1 and Comparative Example 2.

Meanwhile, FIG. 3A is an image of the precursor structure according to an embodiment of the inventive concept, FIG. 3B is an image of the precursor structure according to Comparative Example 1, and FIG. 3C is an image of the precursor structure according to Comparative Example 2.

Referring to FIGS. 2 and 3, the precursor (ZIF-67) prepared according to an embodiment of the inventive concept may be synthesized as a hollow sphere having a plurality of pores and hollows due to presence of methanol ions and sulfate ions in a synthesis process.

In addition, the precursor according to Comparative Example 1 may be formed as stacked nanoplates and the precursor according to Comparative Example 2 may be formed as a solid dodecahedron.

[Table 1] below is a table comparing physical characteristics of the precursor according to the embodiment to the precursors according to Comparative Example 1 and Comparative Example 2.

TABLE 1

| | Example $CH_3OH + SO_4^{2-}$ | Comparative Example 1 $H_2O + SO_4^{2-}$ | Comparative Example 2 $CH_3OH + NO_3^-$ |
|---|---|---|---|
| Shape | Hollow sphere | Stacked nanoplates | Solid dodecahedron |
| $SSA(m^2g^{-1})$ | 1314.4 | 1484.7 | 1610.20 |
| Pore volume (Meso/Macro, $cm^3g^{-1}$) | 0.2127 | 0.1123 | 0.0994 |
| Pore volume (Micro, $cm^3g^{-1}$) | 0.6875 | 0.7307 | 0.624 |
| Total Pore volume ($cm^3g^{-1}$) | 0.9002 | 0.8430 | 0.7234 |

TABLE 1-continued

| | Example CH$_3$OH + SO$_4^{2-}$ | Comparative Example 1 H$_2$O + SO$_4^{2-}$ | Comparative Example 2 CH$_3$OH + NO$_3^-$ |
|---|---|---|---|
| Mean Pore size (nm) | 2.5285 | 2.144 | 1.6561 |

In the precursor (hollow sphere) according to an embodiment, a pore structure naturally occurs through a dissolution and recrystallization process due to a crystallization rate and presence of sulfated ions in the solution.

That is, the precursor (hollow sphere) according to the embodiment may have a large specific surface area and pore volume compared to Comparative Example 1 (precursor of stacked nanoplates) and Comparative Example 2 (precursor of solid dodecahedron), and the results may be confirmed as shown in [Table 1].

In the carbonization in S20, the precursor may be carbonized in an inert atmosphere to form a metal-carbon composite including a plurality of metal particles.

In the carbonization in 20, a metal of the metal compound of the precursor may be crystallized into the metal particles through heat treatment and a carbon of the carbon compound of the precursor may be graphitized into a porous carbon material.

Here, in the carbonization in S20, some of the carbon in the precursor may be graphitized by catalysis of the metal.

For example, in the carbonization in S20 of an embodiment of the inventive concept, a metal-carbon composite (Co@NGCNs) may be generated as follows.

The heat treatment is performed in a range of 400 to 800 degrees under a continuous flow of a mixture of argon (100 sccm) and hydrogen (0 sccm to 20 sccm) for 2 hours.

Through this, cobalt nanoparticles having a size distribution of 5 nm to 50 nm are mixed into a carbon structure having a complex pore structure to synthesize the metal-carbon composite (Co@NGCNs).

In the sulfurization in S30, the metal-carbon composite may be sulfurized in a sulfur atmosphere to produce a metal-metal sulfide-carbon composite.

In the sulfurization in S30, some of the crystallized plurality of metal particles may be synthesized as metal sulfide to produce a metal-metal sulfide-carbon composite including metal sulfide and the plurality of metal nanoparticles.

That is, as shown in FIG. 2, in the sulfurization in S30, some of the plurality of metal particles (Co) may be sulfurized to be synthesized as metal sulfide (CoS$_2$).

For example, in an embodiment of the inventive concept, the metal-metal sulfide-carbon composite (Co/CoS$_2$@NGCNs) in the sulfurization in S30 may be generated as follows.

The cobalt-porous carbon composite (Co@NGCNs) is placed in a central part of a tubular heating furnace and 4 times sulfur powder is placed in 10 cm from the central part in a reverse direction of a gas flow.

The sulfurization is carried out for 2 hours at 300° C.

Through this, as a result, the cobalt sulfide/cobalt sulfide-porous carbon composite (Co/CoS$_2$@NGCNs) may be obtained.

The removing of the metal particles in S40 may remove residual metal particles that are not sulfurized from the metal-metal sulfide-carbon composite to form a metal sulfide-carbon composite.

The removing of the metal particles in S40 may remove the metal particles by selectively etching the metal particles through a solution such as an acidic solution.

Here, an area where the metal particles are removed may exist as mesopores.

For example, in an embodiment of the inventive concept, the metal sulfide-carbon composite (CoS$_2$@NGCNs) in the removing of the metal particles in S40 may be generated as follows.

The previously obtained cobalt sulfide/cobalt-porous carbon composite (Co/CoS$_2$@NGCNs) is dispersed in hydrochloric acid of 1M.

The reaction time should be 12 hours or more.

After the removal reaction, unsulfurized cobalt particles may be selectively dissolved in an acid to obtain the cobalt sulfide-porous carbon composite (CoS$_2$@NGCNs).

Here, as the unsulfurized metal (cobalt) particles are removed, the plurality of pores (mesopores) may exist in the metal sulfide-carbon composite to provide spaces to effectively adsorb lithium polysulfide.

In the merging of the sulfur particles in S50, the sulfur particles may be merged in the metal sulfide-carbon composite to generate a metal sulfide-sulfur-carbon composite.

Through this, a content of the sulfur particles in the produced metal sulfide-sulfur-carbon composite may be 60% to 75% by weight based on a total weight of the metal sulfide-sulfur-carbon composite.

For example, in an embodiment of the inventive concept, the metal sulfide-sulfur-carbon composite (CoS$_2$@NGCNs/S) may be generated as follows, in the merging of the sulfur particles in S50.

The previously obtained cobalt sulfide-porous carbon composite (CoS$_2$@NGCNs) and sulfur (S) are mixed in a specific ratio (2:8 or 3:7).

The mixed particles are sealed in a reactor filled with argon gas and reacted at 155 degrees for 12 hours to induce liquefaction and dispersion of sulfur.

After the reaction, the composite is heated at 210° C. for 30 minutes to remove sulfur remaining on the surface.

The metal sulfide-sulfur-carbon composite produced by the above may be used as the cathode active material of the lithium-sulfur battery and may be not simply physically mixed. In addition, the metal particles may be combined with sulfur to exist in the metal sulfide state, and thus the metal sulfide-sulfur-carbon composite may serve as a metal catalyst in the carbon structure.

In addition, as a proportion of sulfur is increased in the metal sulfide-sulfur-carbon composite, reactivity of sulfur participating in an electrochemical redox reaction may be increased in the lithium-sulfur cell.

Furthermore, the shuttle phenomenon of lithium polysulfide generated by the reaction of lithium and sulfur in the lithium-sulfur battery may be suppressed to improve battery performance.

Hereinafter, characteristics of the cathode active material prepared according to an embodiment of the inventive concept will be described with reference to FIGS. 4 and 7.

Figure 4A:
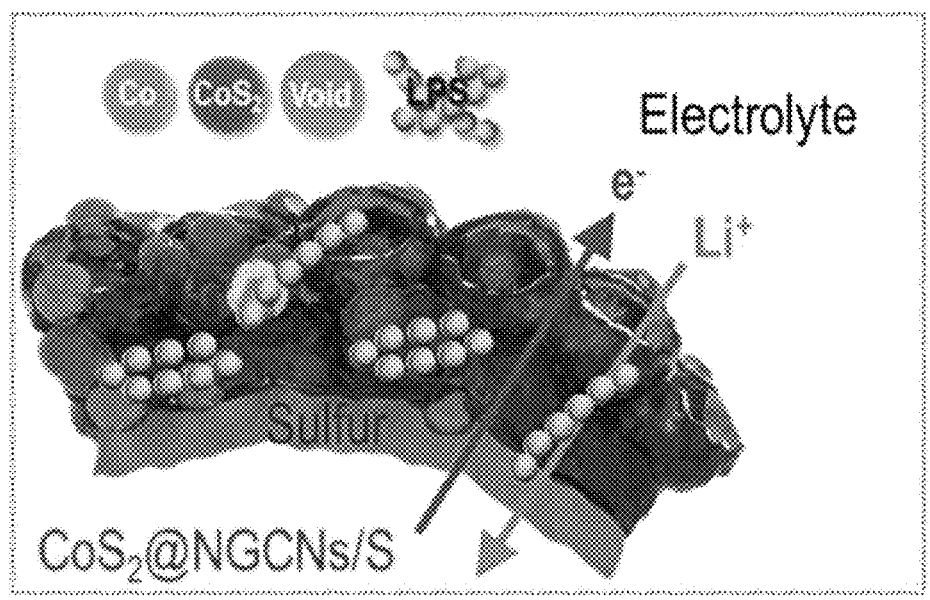
FIG. 4A-FIG. 4C are images comparing a cathode active material structure prepared according to an embodiment of the inventive concept to cathode active material structures according to Comparative Example 3 and Comparative Example 4.
Figure 4B:
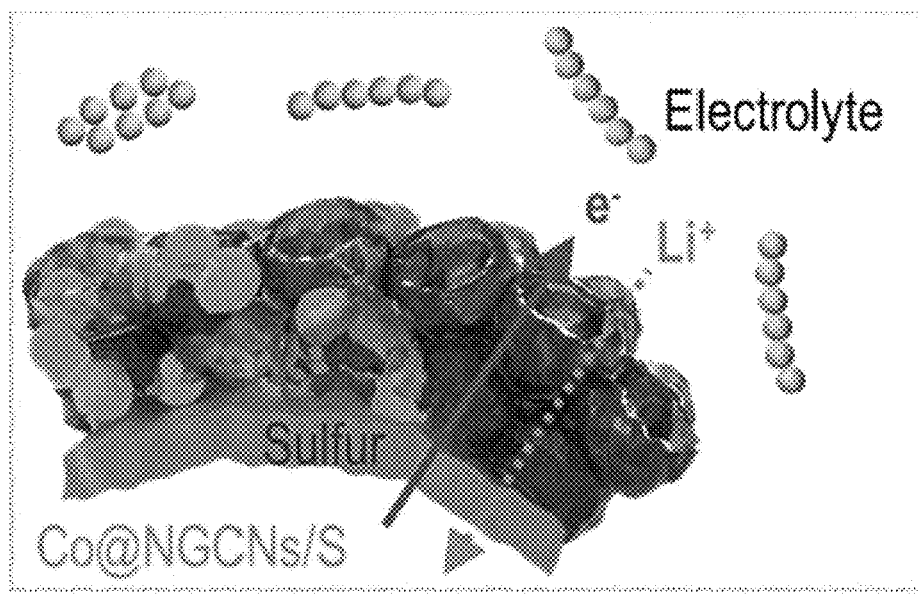
Figure 4C:
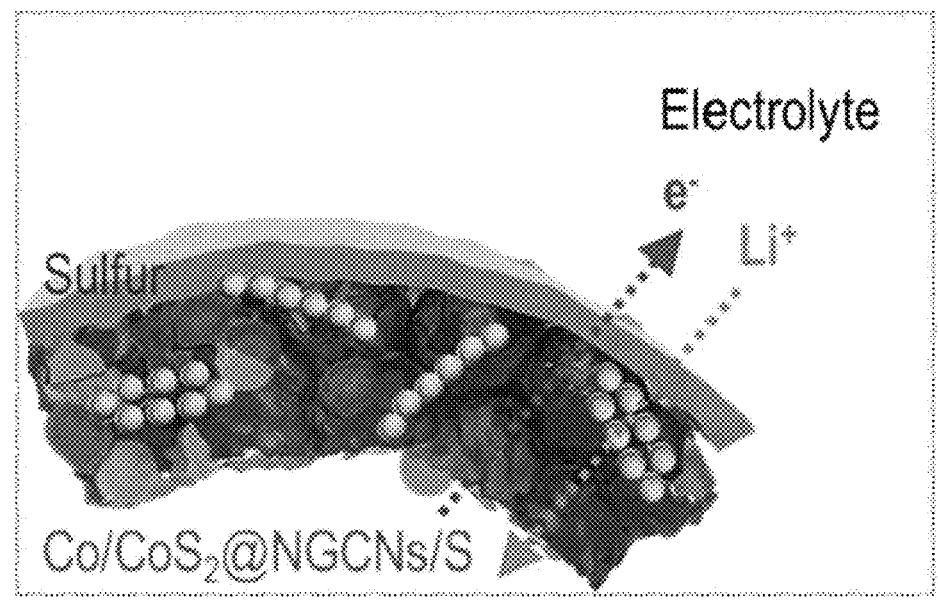

FIG. 4A-FIG. 4C are images comparing a cathode active material structure prepared according to an embodiment of the inventive concept to cathode active material structures according to Comparative Example 3 and Comparative Example 4.

Here, FIG. 4A is an image showing the cathode active material structure prepared according to an embodiment of the inventive concept, FIG. 4B is an image showing the cathode active material structure prepared according to Comparative Example 3, and FIG. 4C is an image showing the cathode active material structure prepared according to Comparative Example 4.

Referring to FIG. 4A-FIG. 4C, the cathode active material according to the embodiment is prepared by the synthesizing of the precursor in S10, the carbonization in S20, the sulfurization in S30, the removing of the metal particle in S40, and the merging of the sulfur particles in S50, the cathode active material prepared according to Comparative Example 3 is prepared by the synthesizing of the precursor in S10, the carbonization in S20, and the merging of the sulfur particles in S50, and the cathode active material prepared according to Comparative Example 4 is prepared by the synthesizing of the precursor in S10, the carbonization in S20, the sulfurization in S30, and the merging of the sulfur particles in S50.

Figure 5:
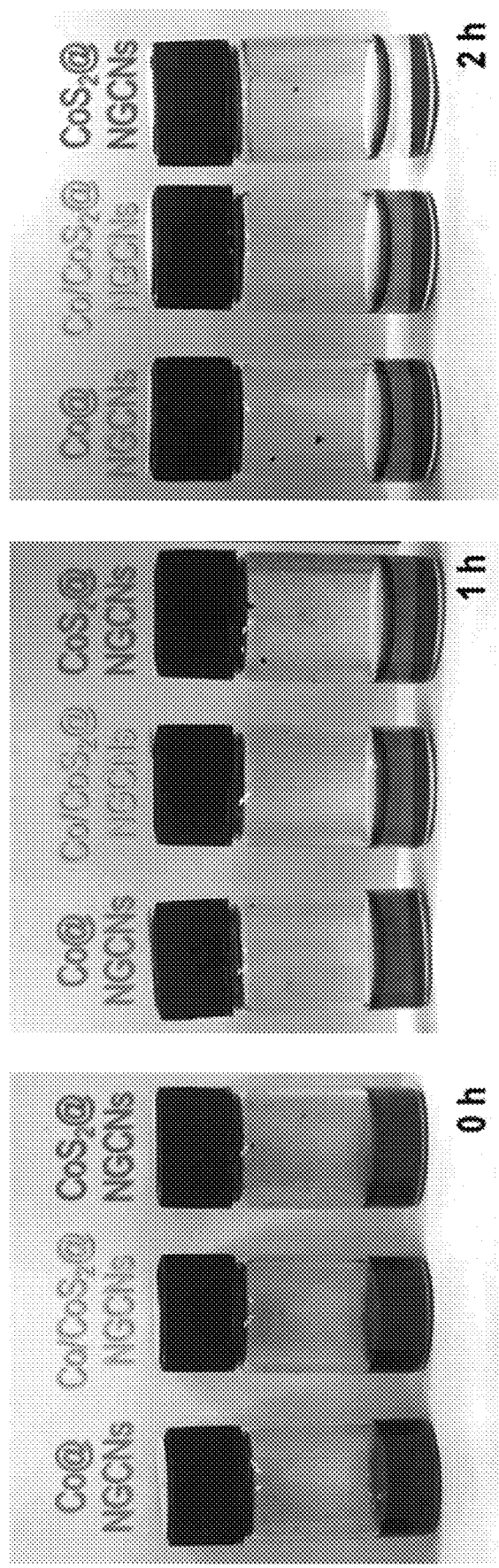
FIG. 5 is images illustrating color changes over time after dispersing a cathode active material prepared according to an embodiment of the inventive concept and cathode active materials according to Comparative Example 3 and Comparative Example 4 in a lithium polysulfide dispersed solution.
Figure 6:
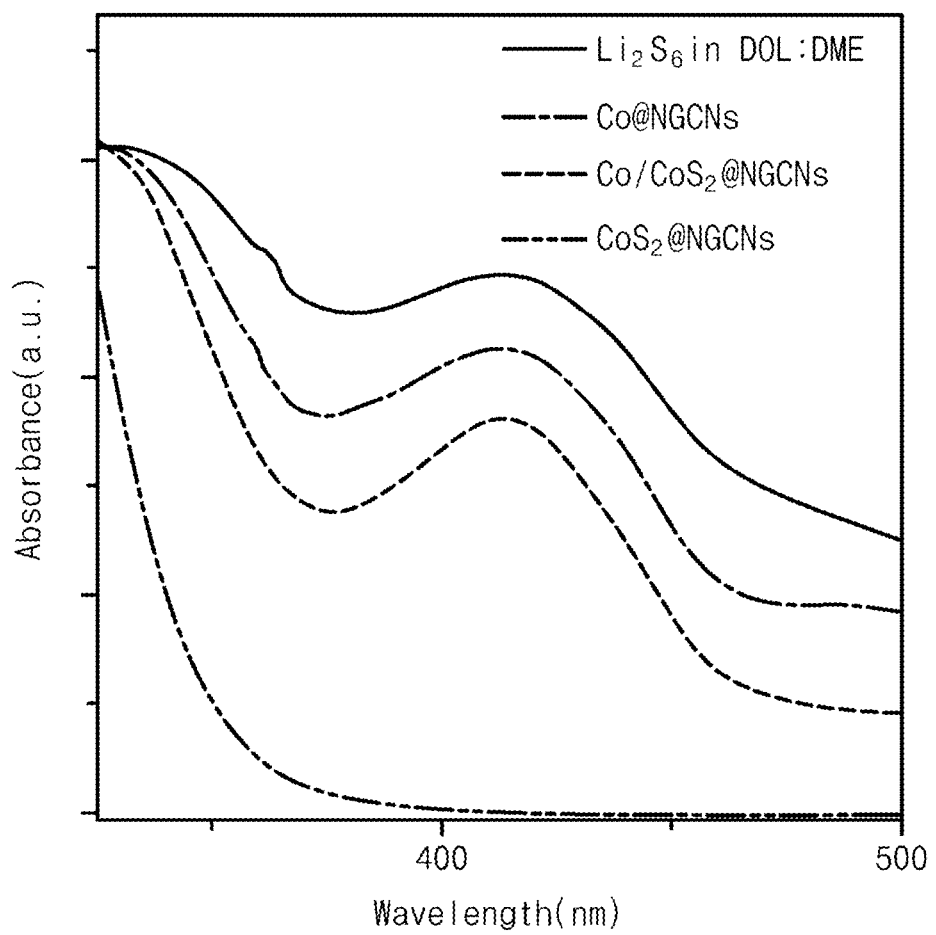
FIG. 6 is a graph illustrating ultraviolet-visible light spectral results of supernatants including a cathode active material prepared according to an embodiment of the inventive concept and cathode active materials according to Comparative Example 3 and Comparative Example 4.

FIG. 5 is images illustrating color changes over time after dispersing a cathode active material prepared according to an embodiment of the inventive concept and cathode active materials according to Comparative Example 3 and Comparative Example 4 in a lithium polysulfide dispersed solution, and FIG. 6 is a graph illustrating ultraviolet-visible light spectral results of supernatants including a cathode active material prepared according to an embodiment of the inventive concept and cathode active materials according to Comparative Example 3 and Comparative Example 4.

Referring to FIG. 5, the color changes over time were observed after the cathode active material prepared according to an embodiment of the inventive concept and the cathode active materials prepared according to Example 3 and Comparative Example 4 in a lithium polysulfide-dispersed solution to confirm adsorption capacity of lithium polysulfide of the cathode active material prepared according to the embodiment of the inventive concept.

Furthermore, referring to FIG. 6, the ultraviolet-visible spectroscopy results of the cathode active materials according to Example, Comparative Example 3, and Comparative Example 4 were observed after 2 hours.

As the results of observation, it may be seen that the cathode active material prepared according to the embodiment of the inventive concept effectively adsorbed lithium polysulfide to become transparent but the active material and the cathode active materials according to Comparative Example 3 and Comparative Example 4 did not completely remove lithium polysulfide.

The cathode active material ($CoS_2$@NGCNs) prepared according to an embodiment of the inventive concept may effectively disperse sulfur by a region (mesopores) from which the metal particles are removed. In addition, as the result of ultraviolet-visible light spectroscopy, the lowest absorption of cobalt sulfide-porous carbon composite ($CoS_2$@NGCNs) may be observed, and polysulfide may be adsorbed through unremoved metal sulfide ($CoS_2$) to be excellent in removal efficiency of lithium polysulfide.

That is, the cathode active material prepared according to an embodiment of the inventive concept effectively adsorbs lithium polysulfide to inhibit lithium polysulfide generated by the reaction of lithium and sulfur in the lithium-sulfur battery from being eluted into an electrolyte.

FIG. 7A-FIG. 7I are graphs illustrating a crystal phase analysis and physicochemical characteristics of a cathode active material prepared according to an embodiment of the inventive concept and cathode active materials according to Comparative Example 3 and Comparative Example 4.

Figure 7A:
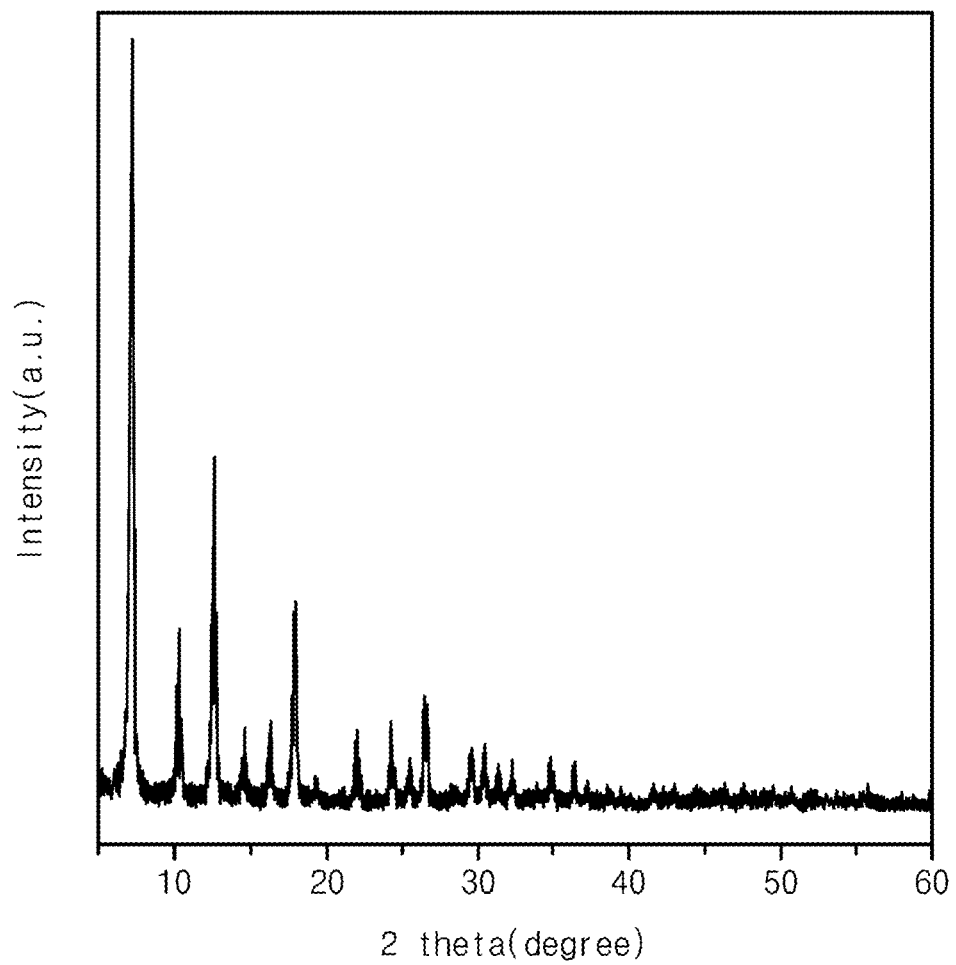
FIG. 7A-FIG. 7I are graphs illustrating a crystal phase analysis and physicochemical characteristics of a cathode active material prepared according to an embodiment of the inventive concept and cathode active materials according to Comparative Example 3 and Comparative Example 4.

Referring to FIG. 7A, as the result of the x-ray diffraction analysis (XRD), it may be confirmed that the cathode active material prepared according to an embodiment was consistent with results of the previously known ZIF-67.

Figure 7B:
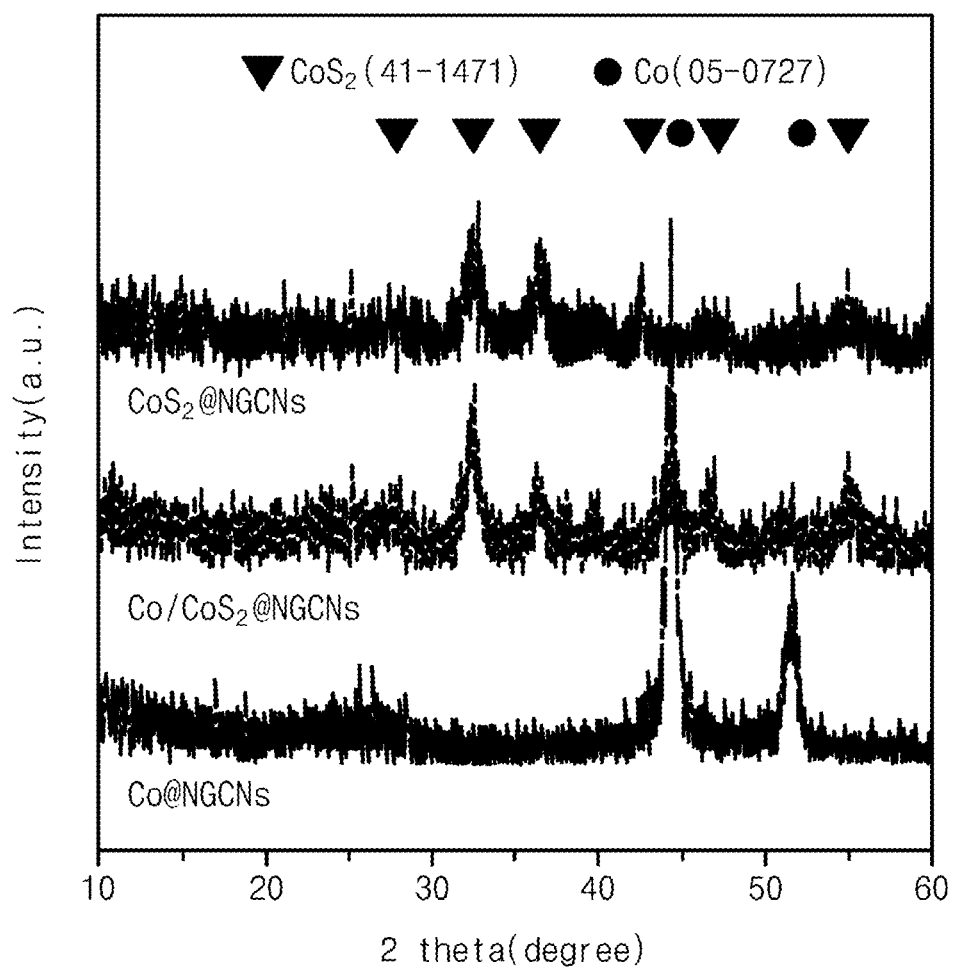

In addition, referring to FIG. 7B, it may be confirmed that a cobalt sulfide-carbon phase was synthesized through the synthesizing of the precursor in S10, the carbonization in S20, the sulfurization in S30, the removing of the metal particle in S40, and the merging of the sulfur particles in S50, in the cathode active material prepared according to the embodiment, a cobalt-carbon phase was synthesized through the synthesizing of the precursor in S10, the carbonization in S20, and the merging of the sulfur particles in S50, in the cathode active material prepared according to Comparative Example 3, and a cobalt/cobalt sulfide-carbon phase was synthesized through the synthesizing of the precursor in S10, the removing of the metal particle in S40, and the merging of the sulfur particles in S50, in the cathode active material prepared according to Comparative Example 4.

Figure 7C:
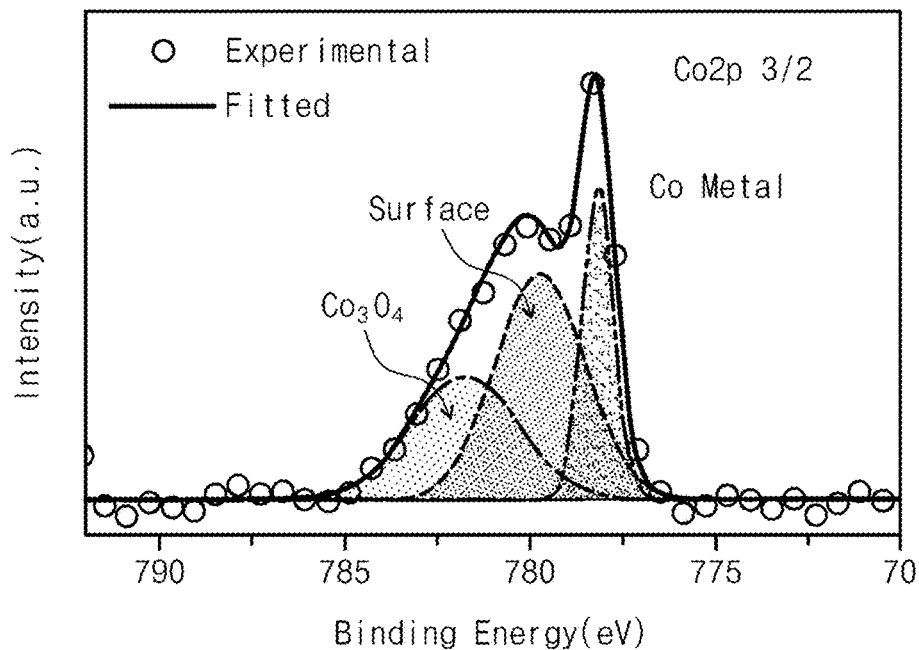
Figure 7D:
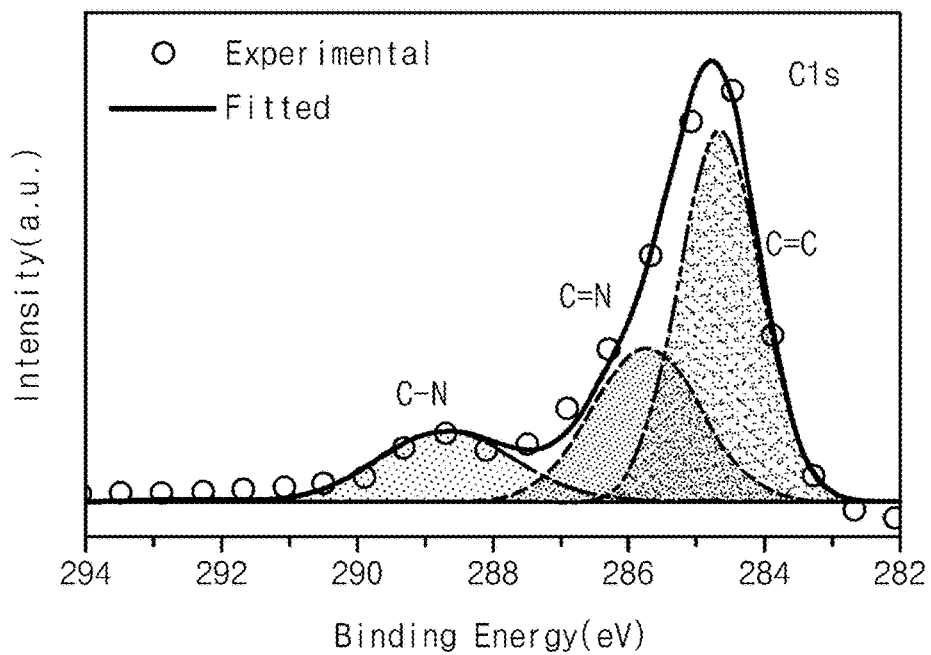
Figure 7E:
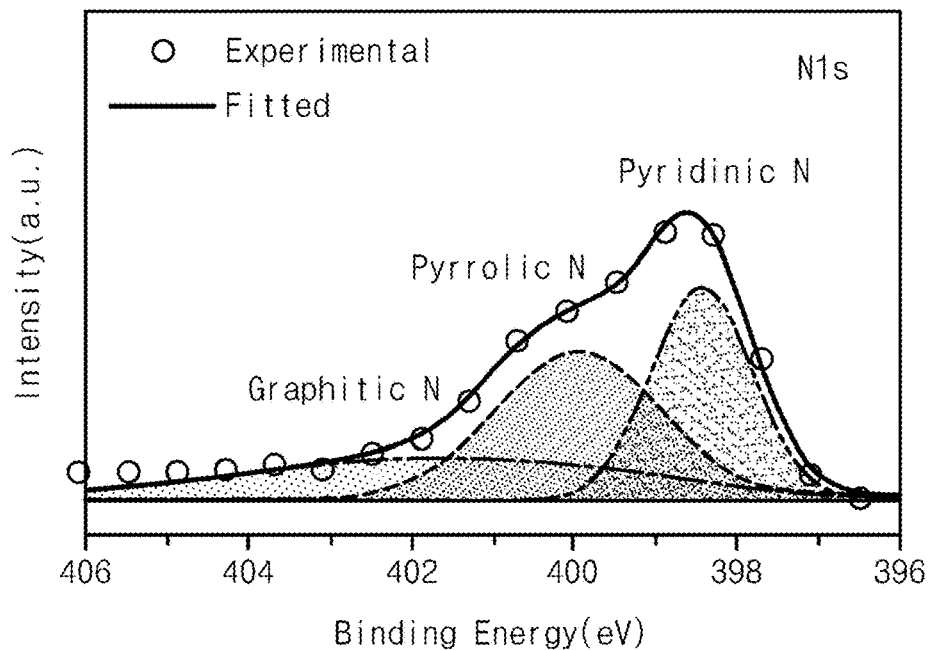
Figure 7F:
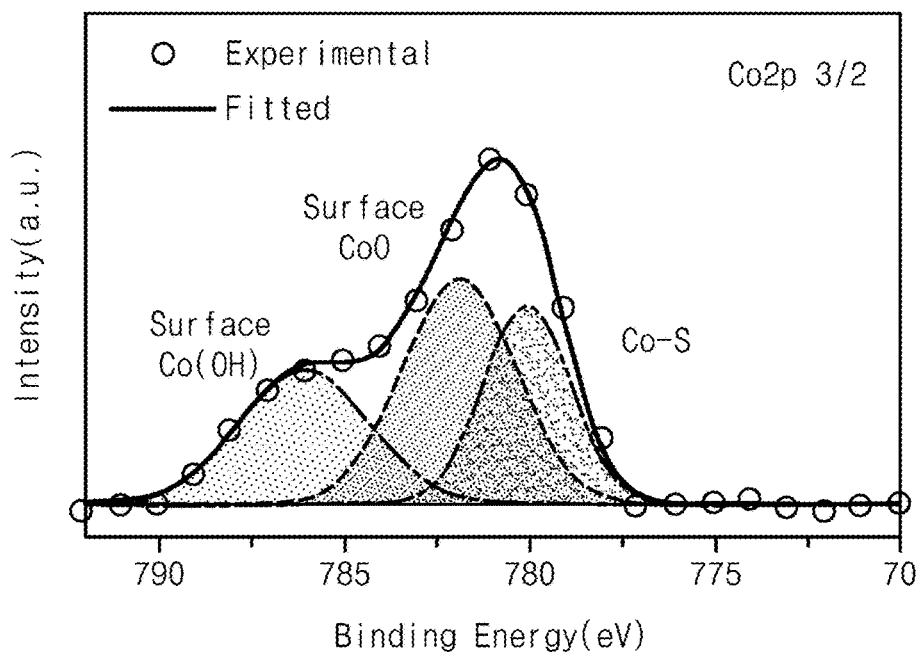
Figure 7G:
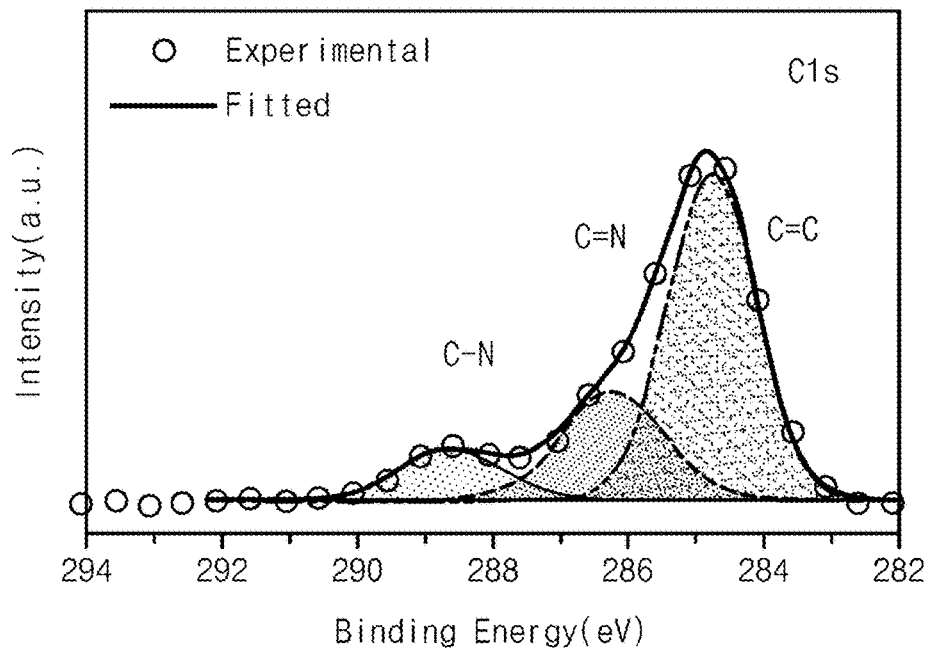
Figure 7H:
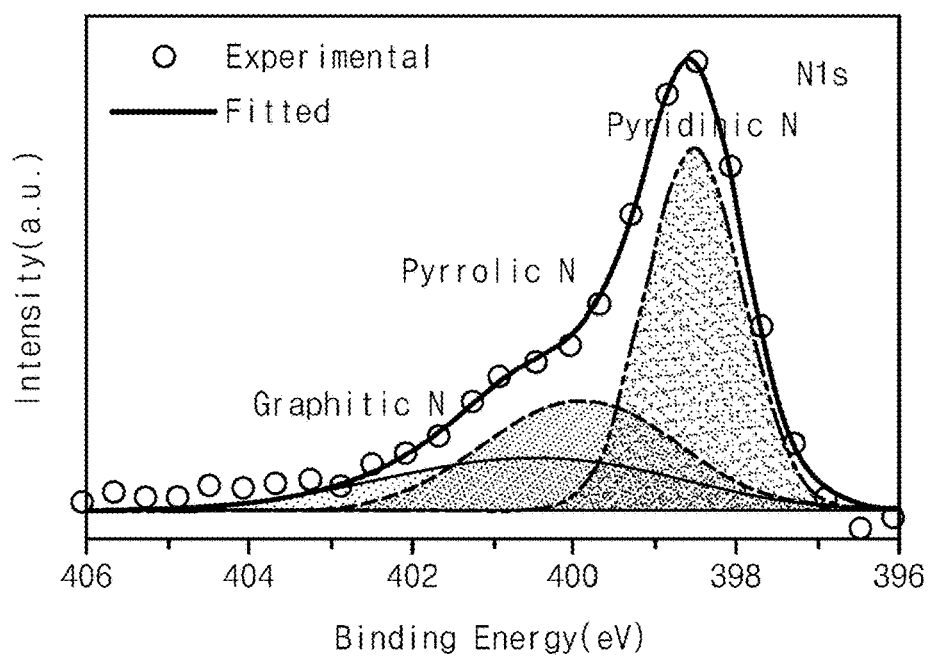

Furthermore, referring to FIGS. 7C to 7E, as the result of XPS analysis of Comparative Example 3 and Example, it may be confirmed that cobalt metal and a small amount of oxide on the surface were present, carbon exists on the surface, and nitrogen doping is present. In addition, a state of nitrogen (N-4, N-5, and N-6) in a carbon lattice may be confirmed.

In addition, referring to FIGS. 7F to 7J, it may be confirmed that metal (cobalt) sulfide, surface oxide, and hydroxide were present, carbon exists on the surface, nitrogen doping is present, and nitrogen is doped in a carbon lattice to have N-4, N-5, and N-6 states.

Figure 7I:
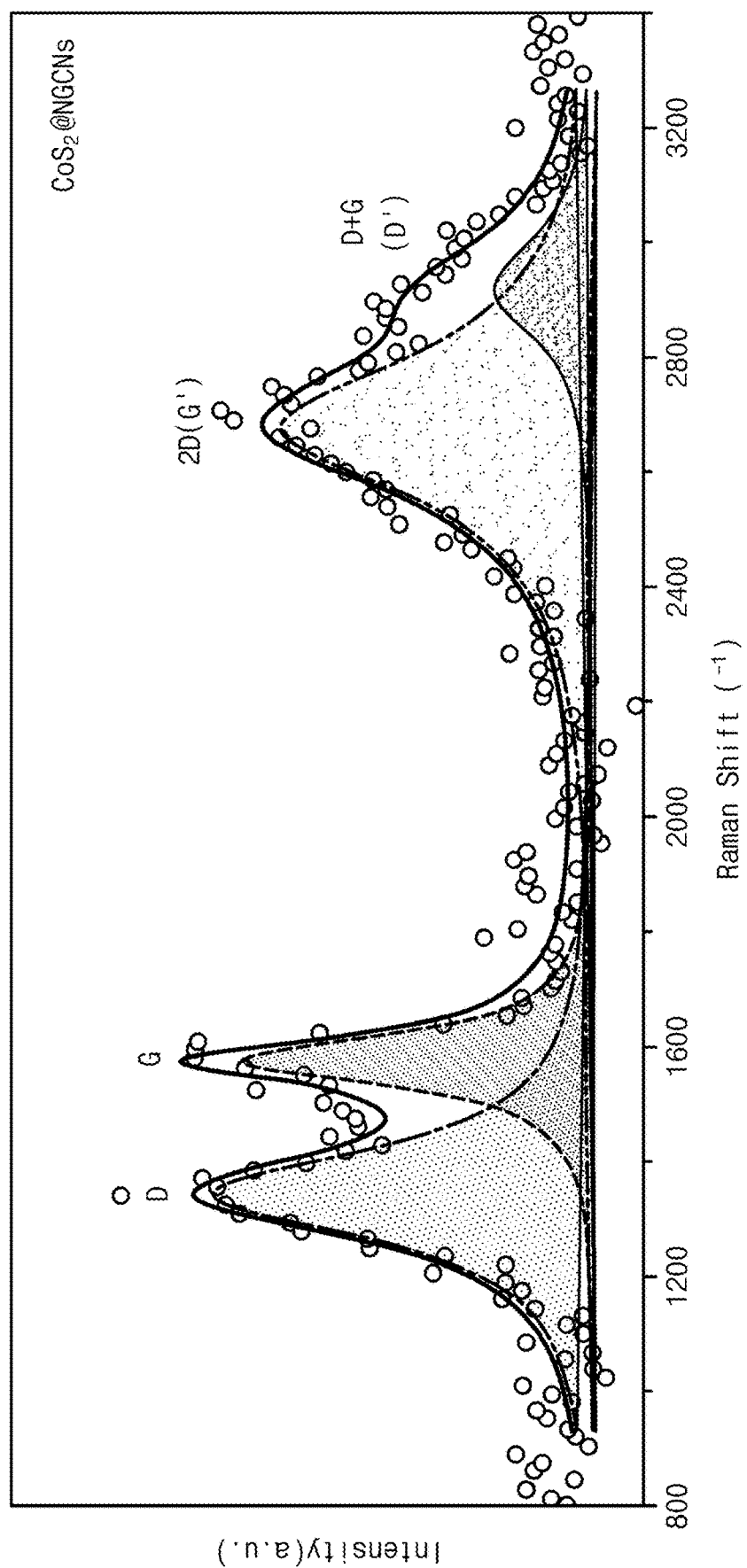

In addition, referring to FIG. 7I, as a result of Raman spectra analysis of cobalt sulfide, it may be confirmed that the precursor according to Example was thermally decomposed to form the carbon structure and disordered carbon and graphitized carbon were blended as all D, G, 2D, and D+G bands are detected.

Hereinafter, a cathode for a lithium-sulfur battery coated with a cathode active material prepared according to a method for manufacturing a cathode active material according to an embodiment of the inventive concept will be described.

A conductive material, a binder, a solvent, and other materials may be added to the cathode active material (metal sulfide-sulfur-carbon composite, $CoS_2$@NGCNs/S) prepared by the above-described manufacturing method to manufacture a cathode composition through a known manufacturing method. The cathode composition may be coated on a current collector to prepare a cathode for a lithium-sulfur battery.

Here, the metal sulfide-sulfur-carbon composite may be included in 50% to 95% by weight based on the total weight of the cathode composition. When the content is less than the range, it is difficult to perform a function as an electrode. On the contrary, when the content exceeds the range, battery performance is deteriorated.

Hereinafter, the conductive material, the binder, the solvent, and other materials constituting the cathode composition will be described.

The conductive material is essential to impart conductivity to the non-conductive sulfur, which is the cathode active material. The conductive material serves to move electrons smoothly within the electrode. As described above in the inventive concept, because the cathode active material includes the carbon material, addition of the separate conductive material may be omitted, but may be added for purpose of facilitating the movement of electrons within the electrode.

The conductive material may be not particularly limited as long as it may have excellent conductivity and may provide a large surface area while a chemical change is not induced in the battery. At least one selected from a graphite-based material such as KS6; a carbon black-based material such as super-p, denka black, acetylene black, ketjen black, channel black, furnace black, lamp black, summer black, and carbon black; a carbon derivative such as fullerene; a conductive fiber such as a carbon fiber and a metal fiber; metal powders such as carbon fluoride, aluminum, and nickel powders, and a conductive polymer such as polyaniline, polythiophene, polyacetylene, and polypyrrole may be used as the conductive material.

In addition, the binder to well adhere the cathode active material to the current collector should dissolve well in a solvent, should well constitute a conductive network between the cathode active material and the conductive material, and should also have a proper impregnation property of the electrolyte.

The binder applicable to the inventive concept may be any binder known in the art, specifically, may be at least one mixture or copolymer selected from the group consisting of a fluorine resin-based binder including polyvinylidene fluoride (PVdF) or polytetrafluoroethylene (PTFE); a rubber-based binder including styrene-butadiene rubber, acrylonitrile-butadiene rubber, and styrene-isoprene rubber; a cellulose-based binder including carboxymethyl cellulose (CMC), starch, hydroxypropyl cellulose, and regenerated cellulose; a poly alcohol-based binder; a polyolefin-based binder including polyethylene and polypropylene, but not limited thereto.

A content of the binder resin may be 0.5 to 30% by weight based on the total weight of the cathode for the lithium-sulfur battery, but is not limited thereto. When the content of the binder resin is less than 0.5% by weight, physical characteristics of the cathode may deteriorate to cause the cathode active material and the conductive material to drop off. In addition, when the content of the binder resin exceeds 30% by weight, a ratio of the active material and the conductive material may be relatively reduced in the cathode to cause battery capacity to be reduced.

In addition, the solvent for preparing the cathode composition for lithium-sulfur battery in a slurry state should be easy to dry and should dissolve the binder well. It is most preferable that the solvent should allow the cathode active material and the conductive material to be maintained in a dispersed state without dissolving.

When the solvent dissolves the cathode active material, because a specific gravity (D=2.07) of sulfur in a slurry is high, sulfur sinks in the slurry and sulfur is concentrated in the current collector during coating, causing problems in the conductive network. Therefore, there is a tendency to cause a problem with operation of the battery.

The solvent according to the inventive concept may be water or an organic solvent. An organic solvent containing at least one selected from the group of dimethylformamide, isopropyl alcohol or acetonitrile, methanol, ethanol, and tetrahydrofuran is applicable as the organic solvent.

In addition, the cathode composition for the lithium-sulfur battery of the inventive concept may further include an additive for increasing binding force of the binder or may further include a surfactant for better dispersing the cathode active material, binder and conductive material in the organic solvent and enhancing viscosity.

Meanwhile, as an embodiment of the inventive concept, a lithium-sulfur battery may include the lithium-sulfur battery cathode described above; a anode including a lithium metal or a lithium alloy as a anode active material; a separator interposed between the anode and the cathode; and an electrolyte impregnated in the anode, cathode and separator and containing lithium salt.

The anode may be used with a material capable of reversibly intercalating or deintercalating lithium ions ($Li^+$) as a anode active material, a material capable of reversibly forming a lithium-containing compound by reacting with lithium ions, lithium metal or lithium alloy. The material capable of reversibly intercalating or deintercalating lithium ions ($Li^+$) may be, for example, crystalline carbon, amorphous carbon, or mixtures thereof. The material capable of reversibly forming a lithium-containing compound by reacting with lithium ions ($Li^+$) may be, for example, tin oxide, titanium nitrate, or silicon. The lithium alloy may be, for example, an alloy of lithium and a metal selected from the group consisting of Na, K, Rb, Cs, Fr, Be, Mg, Ca, Sr, Ba, Ra, Al, and Sn.

The anode active material of the inventive concept may further include a pretreatment layer made of a lithium ion conductive material and a lithium metal protection layer formed on the pretreatment layer, in addition to the anode active material.

The separator interposed between the cathode and the anode may separate or insulate the cathode and the anode from each other, enable transport of lithium ions between the cathode and the anode, and may be made of a porous non-conductive or insulating material. The separator, which is an insulator having high ion permeability and mechanical strength, may be an independent member such as a thin layer or a film, or a coating layer added to the cathode and/or the anode. In addition, when a solid electrolyte such as a polymer is used as the electrolyte, the solid electrolyte may also serve as a separator.

The separator may include pores each generally having a diameter of 0.01 μm to 10 μm, may preferably and generally have a thickness of 5 μm to 300 μm, and may be used with a glass electrolyte, a polymer electrolyte, or a ceramic electrolyte. For example, olefin-based polymers such as chemically and hydrophobic polypropylene, a sheet or non-woven fabric made of glass fiber or polyethylene, or craft are used. Typical examples currently on the market include Celgard series (Celgard R 2400, 2300 Hoechest Celanese Corp.), polypropylene separator (manufactured by Ube Industries Ltd. or Pall RAI), and polyethylene series (Tonen or Entek).

The solid-state electrolyte separator may include less than about 20% by weight of a non-aqueous organic solvent, and in this case, may further include an appropriate gelling agent to reduce fluidity of the organic solvent. Representative examples of the gelling agent include polyethylene oxide, polyvinylidene fluoride, and polyacrylonitrile.

The electrolyte impregnated in the anode, the cathode, and the separator contains lithium salt, and is used with a non-aqueous organic solvent, an organic solid electrolyte, and an inorganic solid electrolyte.

For example, the lithium salt of the inventive concept, which is a material soluble in a non-aqueous organic solvent, may include at least one from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, lithium chloroborane, lower aliphatic lithium carboxylate, lithium 4-phenyl borate, and imide.

A concentration of the lithium salt may be 0.2M to 2M, specifically 0.6M to 2M, and more specifically 0.7M to 1.7M depending on several factors, such as exact composition of the electrolyte mixture, solubility of the salt, conductivity of the dissolved salt, charging and discharging conditions of a cell, working temperature, and other factors known in the field of the lithium battery. When the lithium salt is used below 0.2M, the conductivity of the electrolyte may be lowered, resulting in deterioration of electrolyte performance. When the lithium salt is used above 2M, viscosity of the electrolyte may increase to allow mobility of lithium ions ($Li^+$) to be decreased.

The non-aqueous organic solvent should dissolve the lithium salt well. For example, the non-aqueous organic solvent of the inventive concept may be used with an aprotic organic solvent such as N-methyl-2-pyrrolidinone, propylene carbonate, ethylene carbonate, butylene Carbonate, dimethyl carbonate, diethyl carbonate, ethylmethyl carbonate, gamma-butylo lactone, 1,2-dimethoxy ethane, 1,2-diethoxy ethane, tetrahydroxyfran, 2-methyl tetrahydrofuran, dimethylsulfoxide, 1,3-dioxorun, 4-methyl-1,3-dioxene, diethyl ether, formamide, dimethylformamide, dioxorun, acetonitrile, nitromethane, methyl formate, methyl acetate, phosphoric acid triester, trimethoxy methane, dioxron derivative, sulfolane, methyl sulfolane, 1,3-dimethyl-2-imidazolidinone, propylene carbonate derivative, tetrahydrofuran derivative, ether, methyl pyropionate, ethyl propionate, and the organic solvent may be a mixture of at least one organic solvent.

The organic solid electrolyte may be used with, for example, polyethylene derivatives, polyethylene oxide derivatives, polypropylene oxide derivatives, phosphoric acid ester polymers, poly agitation lysine, polyester sulfide, polyvinyl alcohol, polyvinylidene fluoride, polymer containing an ionic dissociative group.

The inorganic solid electrolyte of the inventive concept may be used with, for example, Li nitrides, halides, and sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Pyridine, triethylphosphite, triethanolamine, cyclic ether, ethylene diamine, n-glyme (Glyme), hexaphosphate triamide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, or aluminum trichloride may be added to the electrolyte of the inventive concept for improving charge and discharge characteristics and flame retardancy. In some cases, a halogen-containing solvent such as carbon tetrachloride or ethylene trifluoride may be further included to impart non-flammability, carbon dioxide gas may be further included to improve high temperature storage characteristics, and fluoro-ethylene carbonate (FEC), propene sultone (PRS), fluoro-propylene carbonate (FPC) may be further included.

The electrolyte may be used as a liquid electrolyte, or may be used in a form of a solid electrolyte separator. When the electrolyte is used with the liquid electrolyte, a separator made of porous glass, plastic, ceramic, or polymer may be further included as a physical separator having a function of physically separating electrodes.

Hereinafter, electrochemical characteristics of the lithium-sulfur battery including the above-described configuration, and particularly including the cathode active material prepared according to an embodiment of the inventive concept will be described.

FIGS. 8 to 12 are graphs illustrating electrochemical characteristics of lithium-sulfur batteries including a cathode active material prepared according to an embodiment of the inventive concept and cathode active materials according to Comparative Example 3 and Comparative Example 4.

Figure 8:
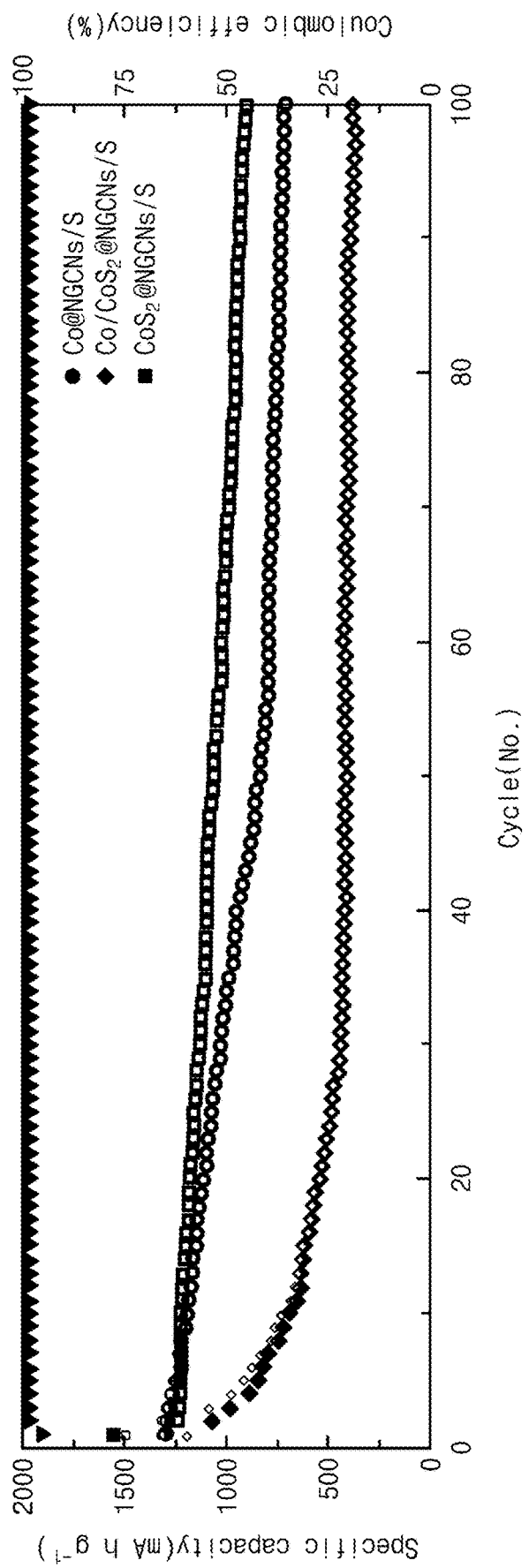
FIGS. 8 to 12 are graphs illustrating electrochemical characteristics of lithium-sulfur batteries including a cathode active material prepared according to an embodiment of the inventive concept and cathode active materials according to Comparative Example 3 and Comparative Example 4.

First, referring to FIG. 8, as a result of 100 cycles of constant current charge and discharge test under current density of 0.1 C, it may be confirmed that 903 mAh $g^{-1}$ was shown in Example (cobalt sulfide-carbon composite). Therefore, it may be seen that Example was excellent in discharge capacity characteristics in a synthesis operation compared to other materials (Comparative Example 3 and Comparative Example 4).

Figure 9:
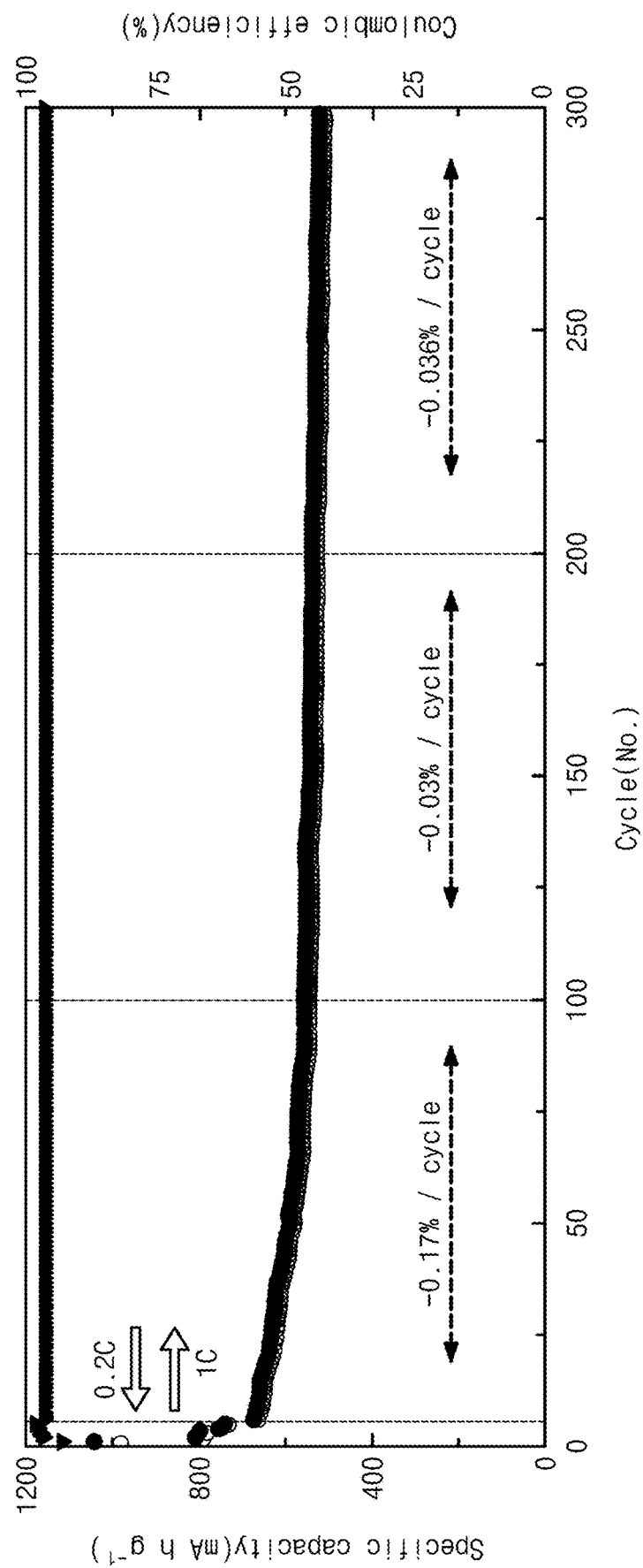

Furthermore, referring to FIG. 9, as a result of a constant current charge and discharge test under a current density of 1 C of an electrode containing the active material of Example (cobalt sulfide-carbon composite), it may be confirmed that a discharge capacity of 500 mAh $g^{-1}$ was exhibited after 300 cycles.

Here, purple data in the measurement results of FIGS. 8 and 9 shows charge and discharge efficiency (%) of the electrode of Example (cobalt sulfide-carbon composite). The charge and discharge efficiency (%) is calculated by charging capacity/discharging capacity×100(%) and the closer to 100%, the higher cycle reversibility. In the inventive concept, the efficiency of the charging and discharging rate of 0.1 C was exhibited about 99%, the efficiency of the charging and discharging rate of 1 C was exhibited about 97% to 98%, and therefore, it may be confirmed that Example was excellent in the charge and discharge efficiency compared to other materials (Comparative Example 3 and Comparative Example 4).

Figure 10A:
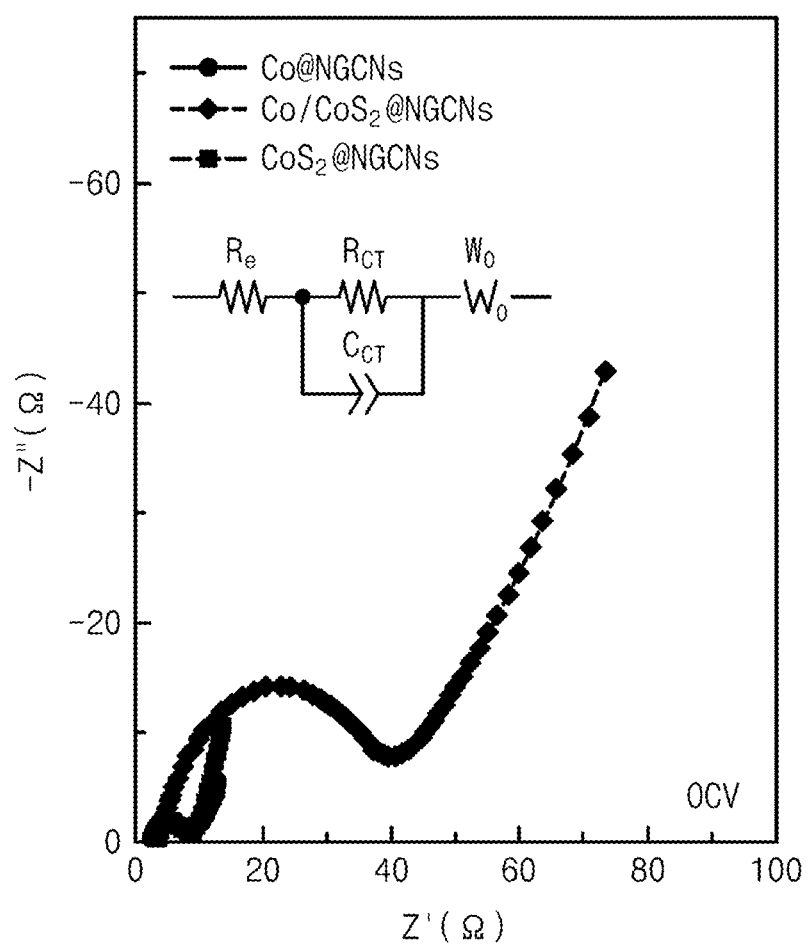
Figure 10B:
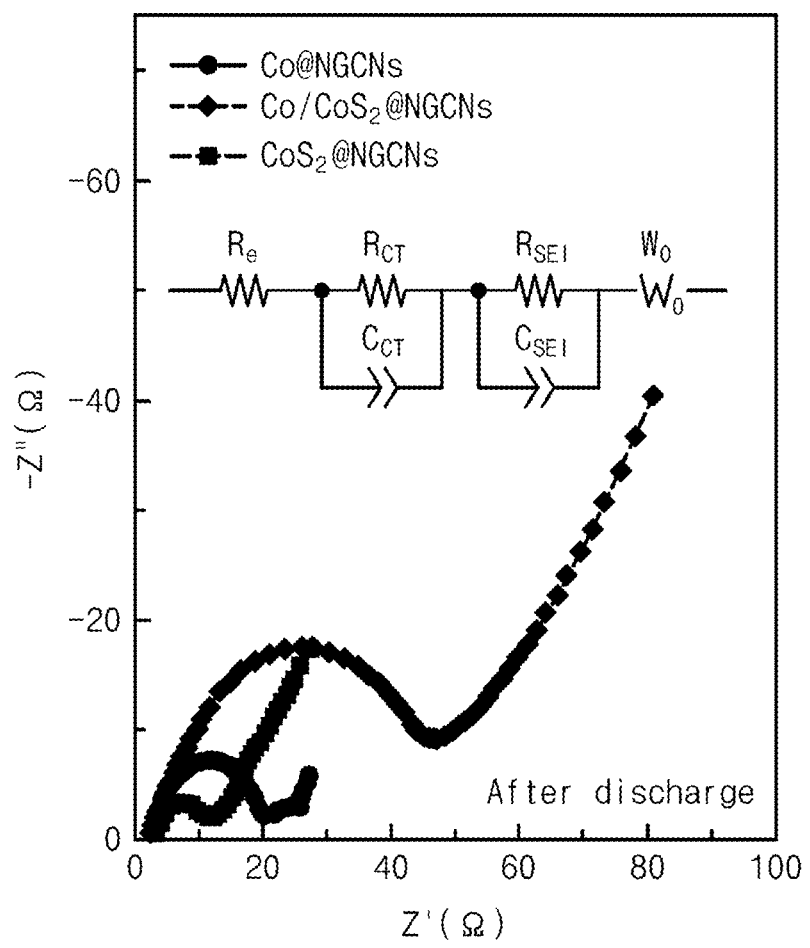
Figure 10C:
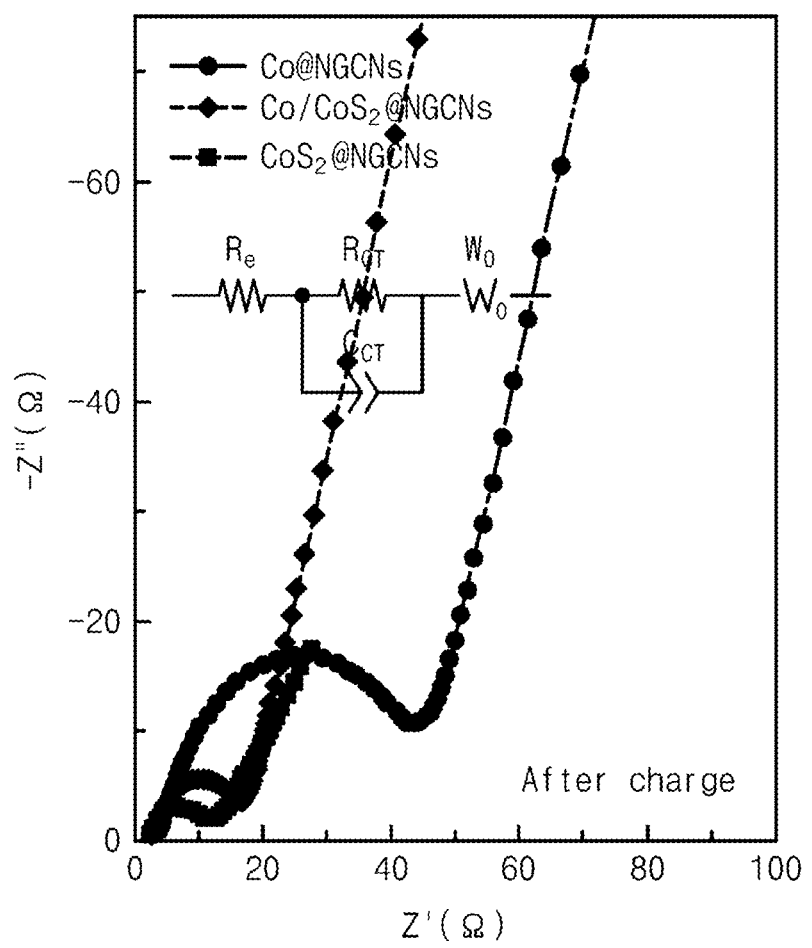

FIG. 10A-FIG. 10C are results of measuring AC resistance of electrodes made of Example, Comparative Example 3, and Comparative Example 4, respectively. FIGS. 10A to 10C are results of AC resistance measured at OCV (open circuit), after a first discharge cycle (1.8V), and after the first charge cycle (2.8V), respectively.

Here, in the FIG. 10A-FIG. 10C, it may be said that the smaller a position of a first point (on X axis) and a diameter of a first half circle (consists of points after the first point), the lower the AC resistance.

In the overall AC resistance inherent in a material, in FIG. 10A (OCV, before electrochemical reaction), it may be confirmed that the sulfur particles became more evenly dispersed due to unique distribution of mesopores when complexation with sulfur, and therefore the electrode of Example (cobalt sulfide-carbon composite) had a low initial AC resistance.

Meanwhile, the electrode of Comparative Example 3 (cobalt-carbon composite) showed a similar level to Example. However, in the case of the electrode of Comparative Example 4 (cobalt/cobalt sulfide-carbon), it may be confirmed that the volume of the sulfurized cobalt expanded, the mesopores were shrunk, the sulfur particles did not disperse evenly, and a high AC resistance was exhibited.

Here, the electrode of Example (cobalt sulfide-carbon composite) clearly revealed the effect caused when repeated charging and discharging. The characteristics of cobalt sulfide that adsorbs lithium polysulfide well and advantage of the mesopores generated by removing the cobalt metal particles were well harmonized in the electrode of Example, and thus it may be confirmed that the electrode of Example showed excellent electrical conductivity and polysulfide adsorption ability to improve the reversible charge and discharge characteristics compared to Comparative Example 3 (cobalt-carbon composite) without polysulfide adsorption ability and Comparative Example 4 (cobalt/cobalt sulfide-carbon composite), which has few mesopores not to evenly disperse sulfur.

Figure 11:
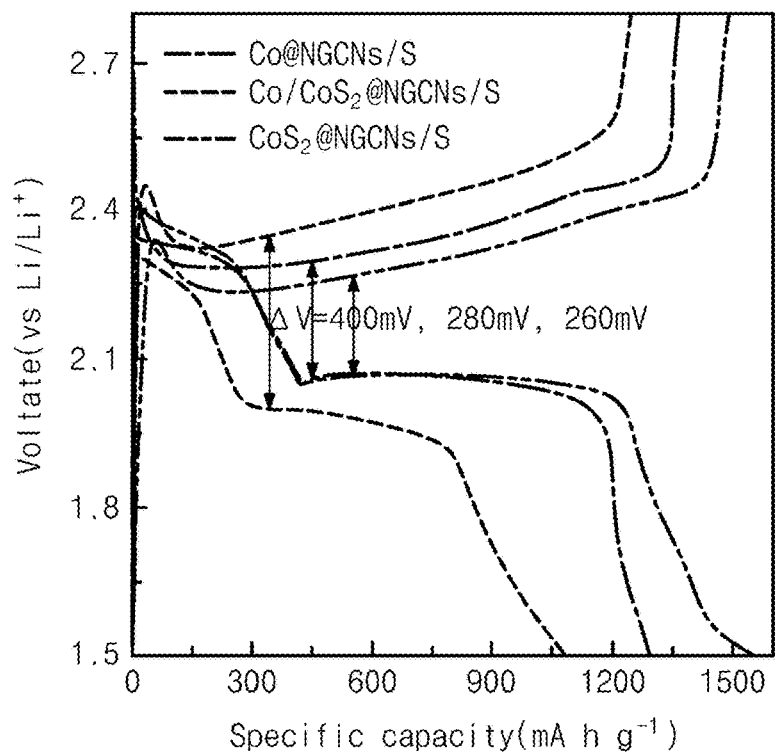

FIG. 11 shows voltage change behavior of the electrode made in each of Example, Comparative Example 3, and Comparative Example 4 in the first charge and discharge cycle.

Here, delta-V represents a degree of polarization of each electrode. The worse electrical conductivity of the electrode, the greater a voltage difference during charging and discharging.

It may be seen that the electrode of Example (cobalt sulfide-carbon composite) had excellent electrical conductivity compared to the electrodes of Comparative Example 3 and Comparative Example 4.

As described above, sulfur may be evenly dispersed by the plurality of mesopores formed by removing the metal (cobalt) particles. Therefore, the electrode of Example (cobalt sulfide-carbon composite) may have excellent electrical conductivity due to uniform dispersion of sulfur.

Figure 12:
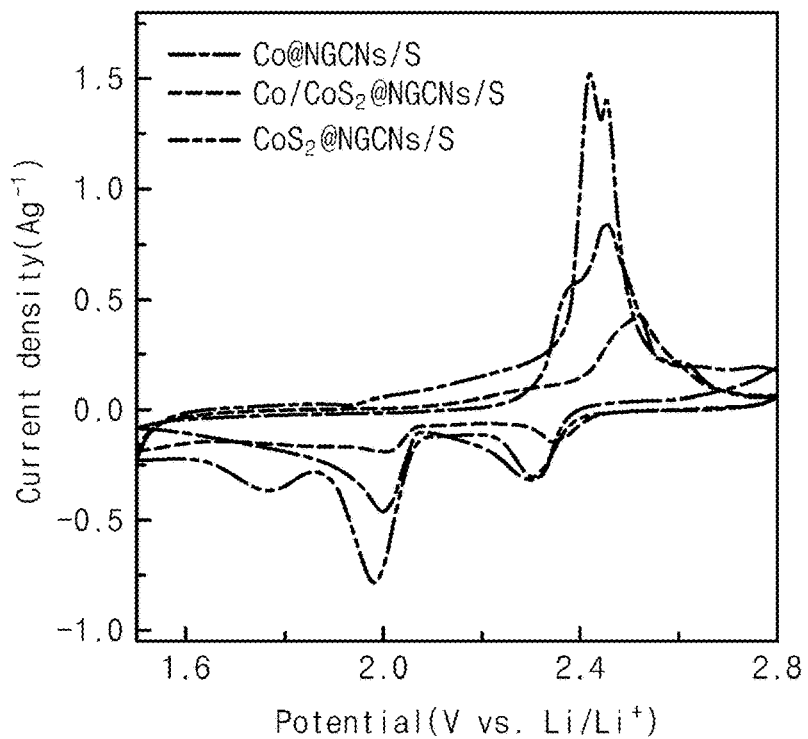

In addition, FIG. 12 shows results of cyclic voltammetry of the electrodes made of Example, Comparative Example 3, and Comparative Example 4, respectively.

The cyclic voltammetry is a method of observing magnitude of a current generated as a voltage applied to each electrode is varied at a constant rate. It may be seen that the higher the electrode activity (degree of reaction), the larger peak size.

Here, the activity of the electrode is that the amount of sulfur capable of reacting is large, and thus it may be confirmed that the reactivity of the electrode of Example (cobalt sulfide-carbon composite) of the three samples was the highest.

This is because, as described above, the electrode of Example has the mesoporous structure in which sulfur close to nonconductor is capable of reacting well due to the even distribution of sulfur.

On the other hand, it may be confirmed that the activity was lowered in the electrodes of Comparative Example 3 and Comparative Example 4 because the degree of sulfur dispersion was uneven compared to Example.

The method of manufacturing the cathode active material, the active material, the cathode for the lithium-sulfur battery, and the lithium-sulfur battery according to an embodiment of the inventive concept are capable of preparing the porous carbon composite, and increasing conductivity and the sulfur content ratio when preparing the complex of the porous carbon composite and sulfur, compared to the mechanical mixture of the conventional sulfur electrode or carbon.

Meanwhile, effects of the inventive concept that may be obtained in the inventive concept are not limited to the foregoing effects and any other technical effects not mentioned herein may be easily understood by a person skilled in the art from the following disclosure.

The above-described detailed descriptions are only examples of the present disclosure. In addition, the above-described descriptions have described exemplary embodiments of the present disclosure, and the present disclosure may be used in various other combinations, modifications, and environment. That is, the present disclosure may be changed and modified in a range of the concept and in an equivalent range of the content of the disclosure disclosed in the present specification and/or in technology or knowledge in the art. The described embodiments describe the best state for implementing the concept of the present disclosure, and various modifications required for applying the present disclosure to specific fields and uses may be possible. Accordingly, the above-describe detailed description of the present disclosure does not limit the present disclosure to the embodiments disclosed. In addition, the appended claims should be interpreted to include other embodiments.

What is claimed is:

1. A method of manufacturing a cathode material, the method comprising:
    synthesizing a precursor including a metal compound and a carbon compound;
    carbonizing the precursor in an inert atmosphere to produce a metal-carbon composite;
    sulfurizing the metal-carbon composite in a sulfur atmosphere to produce a metal-metal sulfide-carbon composite;
    removing metal particles from the metal-metal sulfide-carbon composite to produce a metal sulfide-carbon composite; and
    merging sulfur particles in the metal sulfide-carbon composite to produce a metal sulfide-sulfur-carbon composite.

2. The method of claim 1, wherein, in the synthesizing of the precursor,
    a first solution in which the metal compound is dissolved and a second solution in which the carbon compound is dissolved are mixed, washed and dried to synthesize the precursor.

3. The method of claim 2, wherein, in the carbonizing of the precursor,
    a metal of the metal compound of the precursor is crystallized into metal particles, and a carbon of the carbon compound of the precursor is graphitized into a porous carbon material,
    to produce a porous metal-carbon composite including a plurality of metal particles.

4. The method of claim 3, wherein, in the carbonizing of the precursor, a carbon of the carbon compound of the precursor is graphitized by catalysis of the metal.

5. The method of claim 3, wherein, in the sulfurizing of the metal-carbon composite,
    some metal particles of the plurality of metal particles are synthesized into metal sulfide,
    to produce the metal-metal sulfide-carbon composite including the metal sulfide and a plurality of metal nanoparticles.

6. The method of claim 5, wherein, in the removing of the metal particles,
    the plurality of metal nanoparticles are removed by etching in an acidic solution.

7. The method of claim 1, wherein, in the merging of the sulfur particles,
    a content of the sulfur particles is 60% to 75% by weight based on a total weight of the metal sulfide-sulfur-carbon composite.

8. The method of claim 1, wherein, in the synthesizing of the precursor,
    the precursor has a hollow sphere including a plurality of internal pores.

* * * * *